(12) United States Patent
Yamashita et al.

(10) Patent No.: US 10,113,591 B2
(45) Date of Patent: Oct. 30, 2018

(54) MAGNETIC FLUID SEALING STRUCTURE FOR HIGH-SPEED ROTATION

(71) Applicants: RAILWAY TECHNICAL RESEARCH INSTITUTE, Tokyo (JP); EAGLE INDUSTRY CO., LTD., Tokyo (JP)

(72) Inventors: Tomohisa Yamashita, Tokyo (JP); Masafumi Ogata, Tokyo (JP); Yuki Arai, Tokyo (JP); Keisuke Yoshizawa, Tokyo (JP); Yoshihisa Takano, Tokyo (JP); Shinji Nishida, Tokyo (JP)

(73) Assignees: RAILWAY TECHNICAL RESEARCH INSTITUTE, Tokyo (JP); EAGLE INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 15/519,874

(22) PCT Filed: Oct. 23, 2015

(86) PCT No.: PCT/JP2015/079998
§ 371 (c)(1),
(2) Date: Apr. 18, 2017

(87) PCT Pub. No.: WO2016/063980
PCT Pub. Date: Apr. 28, 2016

(65) Prior Publication Data
US 2017/0248168 A1    Aug. 31, 2017

(30) Foreign Application Priority Data

Oct. 24, 2014 (JP) .................................. 2014-217240

(51) Int. Cl.
*F16J 15/43* (2006.01)
*F16C 33/76* (2006.01)
(Continued)

(52) U.S. Cl.
CPC ............ *F16C 33/765* (2013.01); *F16C 19/08* (2013.01); *F16C 19/54* (2013.01); *F16C 33/82* (2013.01);
(Continued)

(58) Field of Classification Search
CPC ......... F16J 15/43; F16C 33/765; F16C 19/08; F16C 37/007
See application file for complete search history.

(56) References Cited

U.S. PATENT DOCUMENTS 3,620,584 A * 11/1971 Rosensweig ............ F16J 15/40
277/410
5,340,122 A   8/1994 Toboni et al.
(Continued)

FOREIGN PATENT DOCUMENTS

CN    101055037 A    10/2007
CN    102927283 A    2/2013
(Continued)

OTHER PUBLICATIONS

International Search Report, issued in PCT/JP2015/079998, PCT/ISA/210, dated Dec. 28, 2015.
(Continued)

*Primary Examiner* — Gilbert Y Lee
(74) *Attorney, Agent, or Firm* — Birch, Stewart, Kolasch & Birch, LLP

(57) ABSTRACT

A magnetic fluid sealing structure (1) for high-speed rotation for sealing a gap (S) between a shaft member (2) and a housing member (3) disposed around the shaft member (2), which are rotatable, includes: magnetic force generating means (4) which is fixed to the housing member (3) and generates a magnetic force; magnetic pole members (5) disposed on both sides in an axial direction of the magnetic force generating means (4); and a magnetic fluid (7) which is magnetically held between the magnetic pole members (5) and the shaft member (2) by the magnetic force of the
(Continued)

magnetic force generating means (4) and seals the gap (S) therebetween, in which the shaft member (2) has a plurality of different material layers concentrically laminated in a radial direction, and an outermost diameter layer (23) of the shaft member (2), which holds the magnetic fluid (7), is made of a magnetic material.

18 Claims, 5 Drawing Sheets

(51) Int. Cl.
*F16C 33/82* (2006.01)
*F16C 37/00* (2006.01)
*F16C 19/08* (2006.01)
*F16C 19/54* (2006.01)

(52) U.S. Cl.
CPC ............ *F16C 37/00* (2013.01); *F16C 37/007* (2013.01); *F16J 15/43* (2013.01)

(56) References Cited

U.S. PATENT DOCUMENTS 5,826,885 A    10/1998  Helgeland
6,377,658 B1 *  4/2002  Vermilyea ............... F16C 33/76
                                               378/131

FOREIGN PATENT DOCUMENTS

| CN | 103557335 A | 2/2014 |
|----|----|----|
| JP | 60-2059 U | 1/1985 |
| JP | 61-16071 A | 7/1986 |
| JP | 61-160670 A | 7/1986 |
| JP | 61-137168 U | 8/1986 |
| JP | 63-195162 U | 12/1988 |
| JP | 2-105646 U | 8/1990 |
| JP | 6-257675 A | 9/1994 |
| JP | 8-320083 A | 12/1996 |
| JP | 10-184932 A | 7/1998 |
| JP | 2006-179613 A | 7/2006 |
| JP | 4132149 B2 | 8/2008 |
| JP | 2012-62896 A | 3/2012 |

OTHER PUBLICATIONS

Written Opinion of the International Searching Authority, issued in PCT/JP2015/079998, PCT/ISA/217, dated Dec. 28, 2015.
Chinese Office Action and Search Report for Application No. 201580057033.2, dated Mar. 15, 2018, with an English translation of the Search Report.

* cited by examiner

MAGNETIC FLUID SEALING STRUCTURE FOR HIGH-SPEED ROTATION

TECHNICAL FIELD

The present invention relates to a magnetic fluid sealing structure for high-speed rotation applicable to a member that rotates at a high speed.

Priority is claimed on Japanese Patent Application No. 2014-217240, filed on Oct. 24, 2014, the content of which is incorporated herein by reference.

BACKGROUND ART

Hitherto, for example, in a device including a rotating shaft that transmits torque, such as a flywheel energy storage system capable of converting rotational energy into electrical energy or converting electrical energy into rotational energy, so-called vacuum separation is performed in which the atmosphere and a vacuum space are separated by using a magnetic fluid sealing device. As described above, by assembling the magnetic fluid sealing device to the rotating shaft that rotates at a high speed, the atmosphere and the vacuum space can be separated from each other.

On the other hand, the rotating shaft described above rotates at a high speed. Therefore, frictional heat is generated in the magnetic fluid sealing device due to high-speed rotation of the rotating shaft, and it is thus necessary to dissipate the frictional heat. For the purpose of dissipating the frictional heat generated in the magnetic fluid sealing device due to the high-speed rotation of the rotating shaft, a configuration in which heat dissipating fins are provided in the housing of a device to dissipate frictional heat to the atmosphere is proposed (for example, refer to Patent Documents 1 and 2).

In addition, in order to dissipate the frictional heat generated in the magnetic fluid sealing device described above, it is proposed that a cooling mechanism or a heat insulating mechanism is provided in the rotating shaft (for example, refer to Patent Documents 3 and 4).

In addition, in order to dissipate frictional heat generated in the rotating shaft during high-speed rotation, it is proposed that the rotating shaft is formed in a hollow shape and fins are provided on a part of thereof (for example, refer to Patent Document 5). In addition, a technique in which a core made of aluminum having high thermal conductivity is provided on a part of the rotating shaft to act as a part of a thermal shunt between both end portions of the rotating shaft thereby achieving heat dissipation is also proposed (for example, refer to Patent Document 6).

CITATION LIST

Patent Literature

[Patent Document 1] Japanese Unexamined Patent Application, First Publication No. 2006-179613

[Patent Document 2] Japanese Unexamined Utility Model Application, First Publication No. S63-195162

[Patent Document 3] Japanese Unexamined Utility Model Application, First Publication No. S61-137168

[Patent Document 4] Japanese Unexamined Patent Application, First Publication No. S61-160670

[Patent Document 5] Japanese Unexamined Patent Application, First Publication No. S61-160671

[Patent Document 6] Japanese Patent No. 4132149

SUMMARY OF INVENTION

Technical Problem

Here, the frictional heat generated in the magnetic fluid sealing device due to the high-speed rotation as described above is also input to the rotating shaft. Such a rotating shaft is generally made of stainless steel having magnetism, for example, a single stainless steel material having a thermal conductivity of about 12 W/m·K at room temperature. Therefore, the temperature rise of the rotating shaft when the frictional heat is input extremely increases to as high as 100° C. and thus the rotating shaft undergoes significant thermal expansion, which was clarified by the investigation of the inventors. In general, in the magnetic fluid sealing device, a gap interposed with a magnetic fluid is of several tens of μm. However, in a case where a change in the dimensions in a radial direction due to the thermal expansion of the rotating shaft exceeds the above-mentioned numerical value, there is a possibility that the original vacuum separation function may not be maintained. Accordingly, it is required to efficiently dissipate the frictional heat input to the rotating shaft, and suppress the temperature rise of the rotating shaft itself.

However, since the heat dissipating fins described in Patent Documents 1 and 2 are configured to be provided in the housing of the device, it is difficult to dissipate frictional heat input to the body of the rotating shaft.

On the other hand, in Patent Documents 3 and 4, although the cooling mechanism or the heat insulating mechanism is provided in the rotating shaft, the entire rotating shaft is made of stainless steel and is thus excellent in strength characteristics. However, the thermal conductivity thereof is low and it is difficult to effectively dissipate frictional heat input to the body of the shaft body.

In addition, in Patent Document 5, the rotating shaft which has a hollow shape and is provided with the fins is used, and in Patent Document 6, the rotating shaft provided with the core made of aluminum having high thermal conductivity is used. However, in either case, it is difficult to sufficiently dissipate frictional heat input to the rotating shaft.

In consideration of the above-described problems, an object of the present invention is to provide a magnetic fluid sealing structure for high-speed rotation capable of suppressing thermal expansion due to a temperature rise of a rotating shaft and maintaining an excellent vacuum separation function.

Solution to Problem

The inventors intensively studied to solve the above-described problems. In order to solve the problem of thermal expansion of the rotating shaft, it is essential to reduce frictional heat during high-speed rotation, which is a primary factor. However, this is caused by the constituent materials of the magnetic fluid, technical difficulty is extremely high. Then, the inventors paid attention to a measure to suppress the temperature rise of the rotating shaft, which is a secondary factor, that is, an improvement in heat sweeping characteristics (heat dissipation characteristics).

The inventors found that, for example, in a case of a rotating shaft having a diameter of 100 mm, the thickness required for securing the function of a magnetic fluid seal is limited to a range of about 10 mm deep from the outer circumferential surface. As a result, it was found that a part having a diameter of 80 mm in a center portion can be made of a high-strength material required for transmitting a predetermined torque and a material that can satisfy the function of a measure to sweep heat. In addition, it was found that by employing a configuration in which a layer made of a material having significantly higher thermal conductivity than a representative stainless steel material such as SUS630 in the related art, for example, an aluminum material having a maximum thermal conductivity of about 200 W/m·K at room temperature, or a copper material having a maximum thermal conductivity of about 400 W/m·K at room temperature is provided on the inner layer side, the heat dissipation characteristics of the rotating shaft are significantly improved, whereby the present invention has been devised.

A first aspect of a magnetic fluid sealing structure for high-speed rotation according to the present invention is a magnetic fluid sealing structure for high-speed rotation for sealing a gap between a shaft member and a housing member disposed around the shaft member, which are rotatable, including: magnetic force generating means which is fixed to the housing member and generates a magnetic force; magnetic pole members disposed on both sides in an axial direction of the magnetic force generating means; and a magnetic fluid which is magnetically held between the magnetic pole members and the shaft member by the magnetic force of the magnetic force generating means and seals the gap therebetween, in which the shaft member has a plurality of different material layers concentrically laminated in a radial direction, and an outermost diameter layer of the shaft member, which holds the magnetic fluid, is made of a magnetic material.

According to the first aspect of the magnetic fluid sealing structure for high-speed rotation, the different material layers having high thermal conductivities can be disposed on the inner layer side while the shaft member satisfies the function as the rotation shaft. Therefore, frictional heat input to the shaft member is transferred through the different material layers having high thermal conductivities and is dissipated to the outside. Accordingly, the heat dissipation characteristics of the shaft member are improved, and for example, even in a case where the rotating shaft is rotated at a circumferential speed as high as several tens of meters per second, the temperature rise of the shaft member and the resultant thermal expansion can be suppressed, thereby achieving stable vacuum separation.

In a second aspect of the magnetic fluid sealing structure for high-speed rotation according to the present invention, in accordance with the first aspect, the shaft member has a two-layer structure including two types of different material layers, and an innermost diameter layer is made of a good thermal conductive material having a higher thermal conductivity than that of the outermost diameter layer.

According to the second aspect of the magnetic fluid sealing structure for high-speed rotation, frictional heat input to the shaft member is dissipated to the outside, and thus the effect of suppressing a temperature rise can be significantly obtained.

In a third aspect of the magnetic fluid sealing structure for high-speed rotation of the present invention, in accordance with the second aspect, the innermost diameter layer of the shaft member is made of austenitic or martensitic stainless steel, or a titanium alloy material.

According to the third aspect of the magnetic fluid sealing structure for high-speed rotation, the strength characteristics and corrosion resistance of not only the innermost diameter layer but also the entire shaft member are improved.

In a fourth aspect of the magnetic fluid sealing structure for high-speed rotation according to the present invention, in accordance with any one of the first to third aspects, the outermost diameter layer of the shaft member is made of a magnetic material such as austenitic-ferritic, martensitic, or precipitation hardening stainless steel, or an iron-based material.

According to the fourth aspect of the magnetic fluid sealing structure for high-speed rotation, both good characteristics as a magnetic body and good strength characteristics as the outermost diameter layer are achieved.

In a fifth aspect of the magnetic fluid sealing structure for high-speed rotation according to the present invention, in accordance with any one of the first to fourth aspects, the shaft member has a three-layer structure in which an intermediate layer is further provided between the innermost diameter layer and the outermost diameter layer, the intermediate layer is made of a good thermal conductive material having a higher thermal conductivity than that of the outermost diameter layer, and the innermost diameter layer is made of a higher strength material having a high strength than that of the intermediate layer.

According to the fifth aspect of the magnetic fluid sealing structure for high-speed rotation, the effect of suppressing a temperature rise by improving the heat dissipation characteristics of the shaft member can be more significantly obtained.

In a sixth aspect of the magnetic fluid sealing structure for high-speed rotation according to the present invention, in accordance with the fifth aspect, the intermediate layer of the shaft member primarily contains aluminum or copper having a thermal conductivity of 100 W/m·K or higher at room temperature.

According to the sixth aspect of the magnetic fluid sealing structure for high-speed rotation, the effect of suppressing a temperature rise by improving the heat dissipation characteristics of the shaft member can be more significantly obtained.

In a seventh aspect of the magnetic fluid sealing structure for high-speed rotation according to the present invention, in accordance with any one of the first to sixth aspects, at least a part of the innermost diameter layer or the intermediate layer of the shaft member acts as a heat dissipating portion exposed to outside in an axial direction of the shaft member.

According to the seventh aspect of the magnetic fluid sealing structure for high-speed rotation, the heat dissipation characteristics of the shaft member are further improved, and the effect of suppressing a temperature rise can be significantly obtained.

In an eighth aspect of the magnetic fluid sealing structure for high-speed rotation according to the present invention, in accordance with the seventh aspect, the heat dissipating portion is a heat dissipating fin having an uneven shape.

According to the eighth aspect of the magnetic fluid sealing structure for high-speed rotation, the heat dissipation characteristics of the shaft member are further improved, and the effect of suppressing a temperature rise can be significantly obtained.

In a ninth aspect of the magnetic fluid sealing structure for high-speed rotation according to the present invention, in accordance with the seventh aspect, the heat dissipating portion has a pear-skin pattern formed by a blasting treatment.

According to the ninth aspect of the magnetic fluid sealing structure for high-speed rotation, the heat dissipation characteristics of the shaft member are further improved, and the effect of suppressing a temperature rise can be significantly obtained.

In a tenth aspect of the magnetic fluid sealing structure for high-speed rotation according to the present invention, in accordance with any one of the first to ninth aspects, the housing member is provided with a liquid injection port for cooling, an annular groove is provided on an outer diameter side of the magnetic pole member, and a cooling liquid supplied from the liquid injection port is circulated through the annular groove.

According to the tenth aspect of the magnetic fluid sealing structure for high-speed rotation, it becomes possible to efficiently cool the magnetic force generating means and the magnetic pole members.

In an eleventh aspect of the magnetic fluid sealing structure for high-speed rotation according to the present invention, in accordance with any one of the first to tenth aspects, a liquid circulation circuit for circulating the cooling liquid is provided in the innermost diameter layer of the shaft member.

According to the eleventh aspect of the magnetic fluid sealing structure for high-speed rotation, it becomes possible to cause the shaft member to efficiently dissipate heat and cool.

In a twelfth aspect of the magnetic fluid sealing structure for high-speed rotation according to the present invention, in accordance with any one of the first to eleventh aspects, at least a part of a surface of the shaft member is a gear shape or spline shape capable of transmitting rotation.

According to the twelfth aspect of the magnetic fluid sealing structure for high-speed rotation, it becomes possible to easily apply the magnetic fluid sealing structure for high-speed rotation to various applications.

In addition, the outermost diameter layer described in the present invention is a layer disposed on the outermost side in the radial direction in the shaft member, and the innermost diameter layer is a layer disposed on the innermost side in the radial direction.

In addition, in the present invention, parts constituted by the shaft member, the housing member, the magnetic force generating means, the magnetic pole members, the magnetic fluid, and the like are collectively referred to as the magnetic fluid sealing structure for high-speed rotation.

Advantageous Effects of Invention

According to the magnetic fluid sealing structure for high-speed rotation of the present invention, since the different material layers having excellent thermal conductivities are disposed on the inner layer side while the shaft member satisfies the function as the rotation shaft, frictional heat input to the shaft member is easily dissipated to the outside, and the heat dissipation characteristics of the shaft member are improved. Accordingly, for example, even in a case where the rotating shaft is rotated at a circumferential speed as high as several tens of meters per second, the temperature rise of the rotating shaft and the resultant thermal expansion can be suppressed, and it becomes possible to achieve stable vacuum separation.

DESCRIPTION OF EMBODIMENTS

Figure 1:
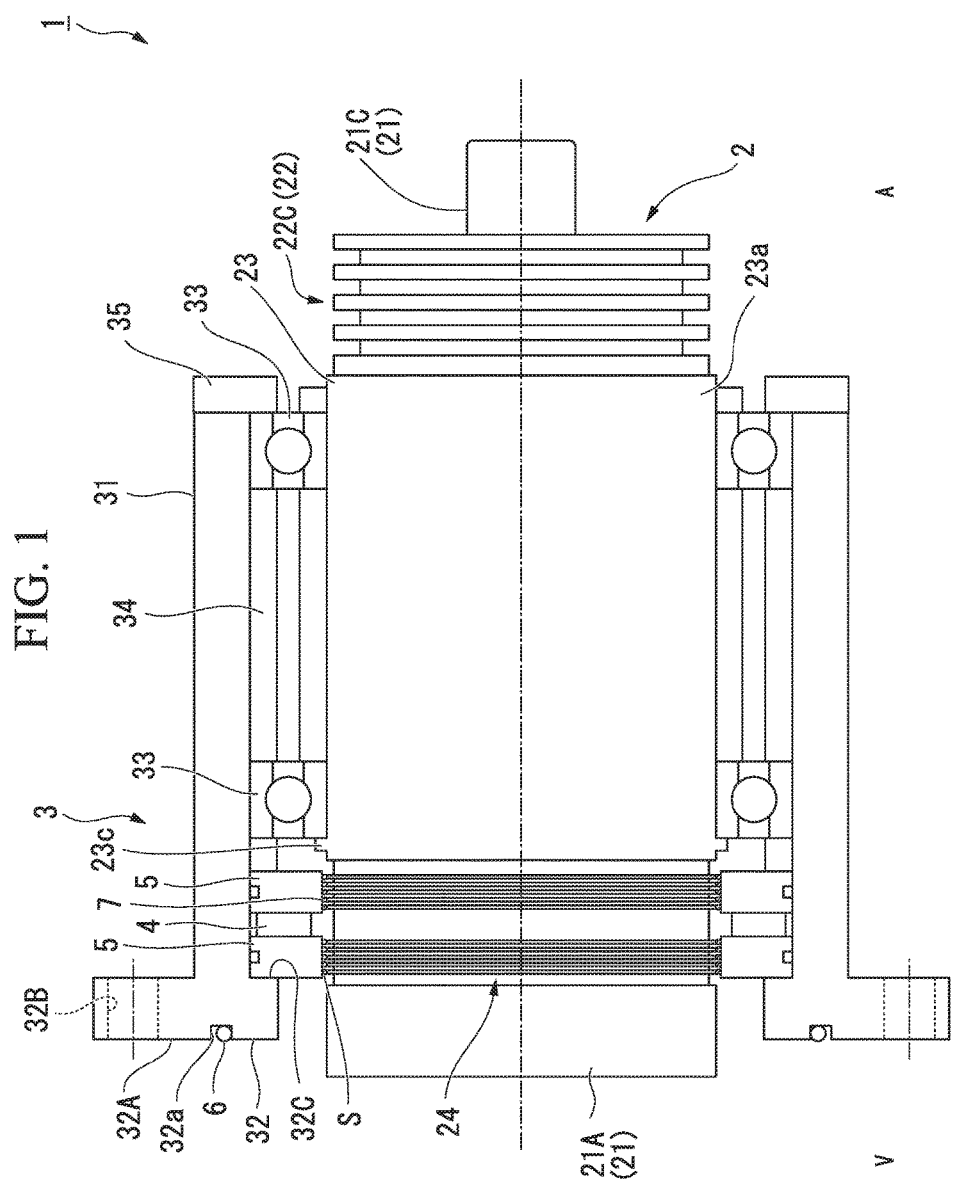
FIG. 1 is a view schematically showing a magnetic fluid sealing structure for high-speed rotation which is an embodiment of the present invention, and is an overall schematic view showing an assembly state of a shaft member and a housing member which are rotatably assembled together.
Figure 2:
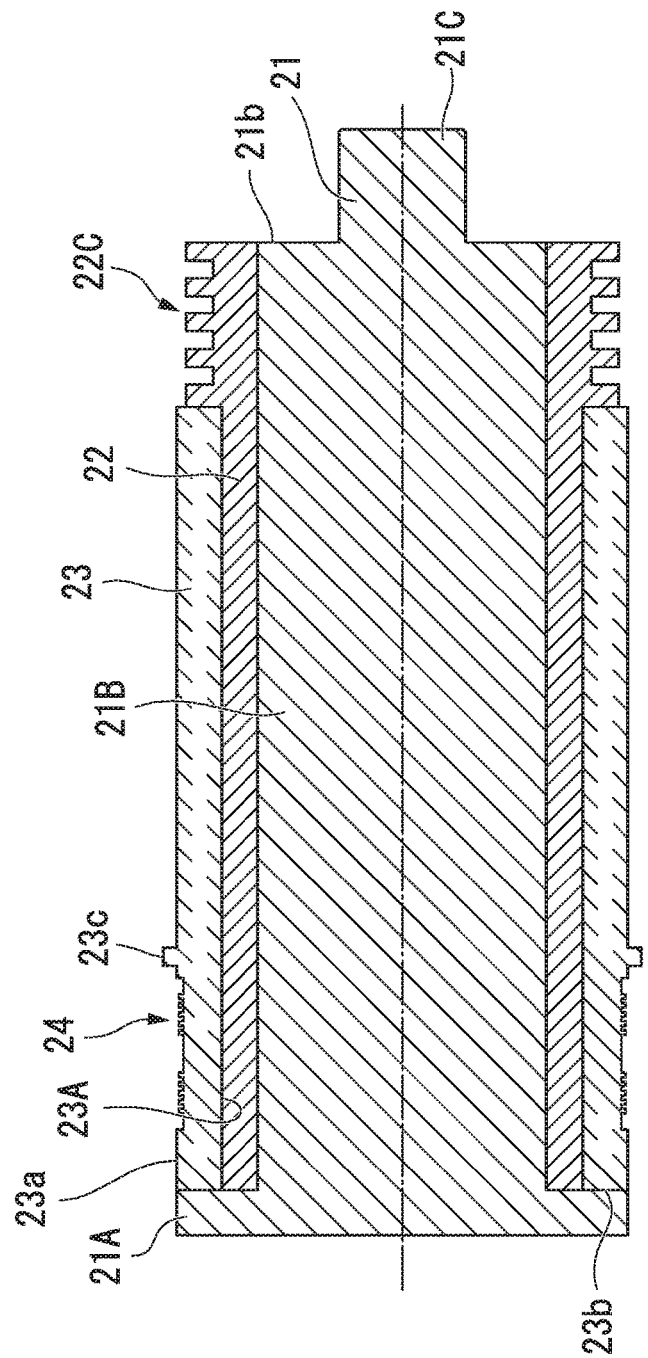
FIG. 2 is a view schematically showing the magnetic fluid sealing structure for high-speed rotation which is an embodiment of the present invention, and is a sectional view showing an example of the layer structure of the shaft member.
Figure 3:
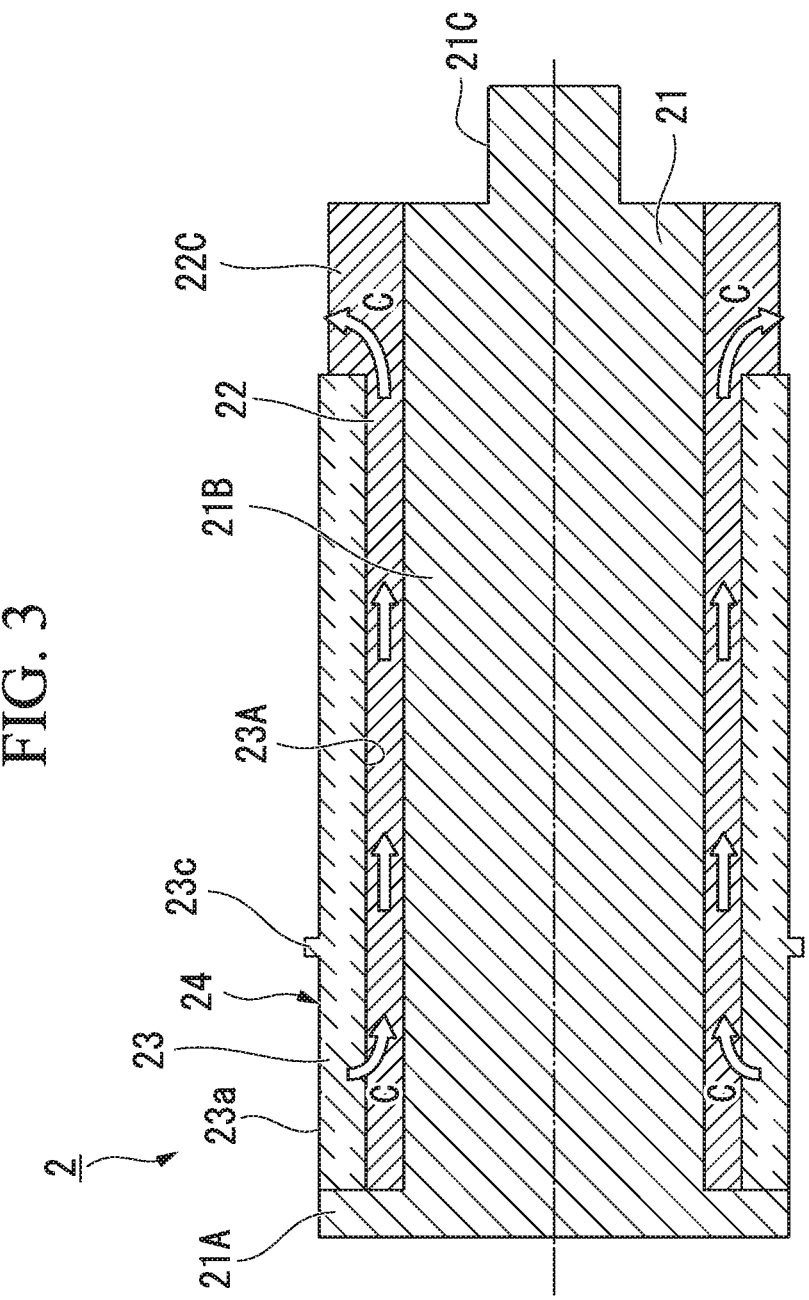
FIG. 3 is a view schematically showing the magnetic fluid sealing structure for high-speed rotation which is an embodiment of the present invention, and is a schematic sectional view showing a conduction path of frictional heat input to the shaft member.
Figure 4:
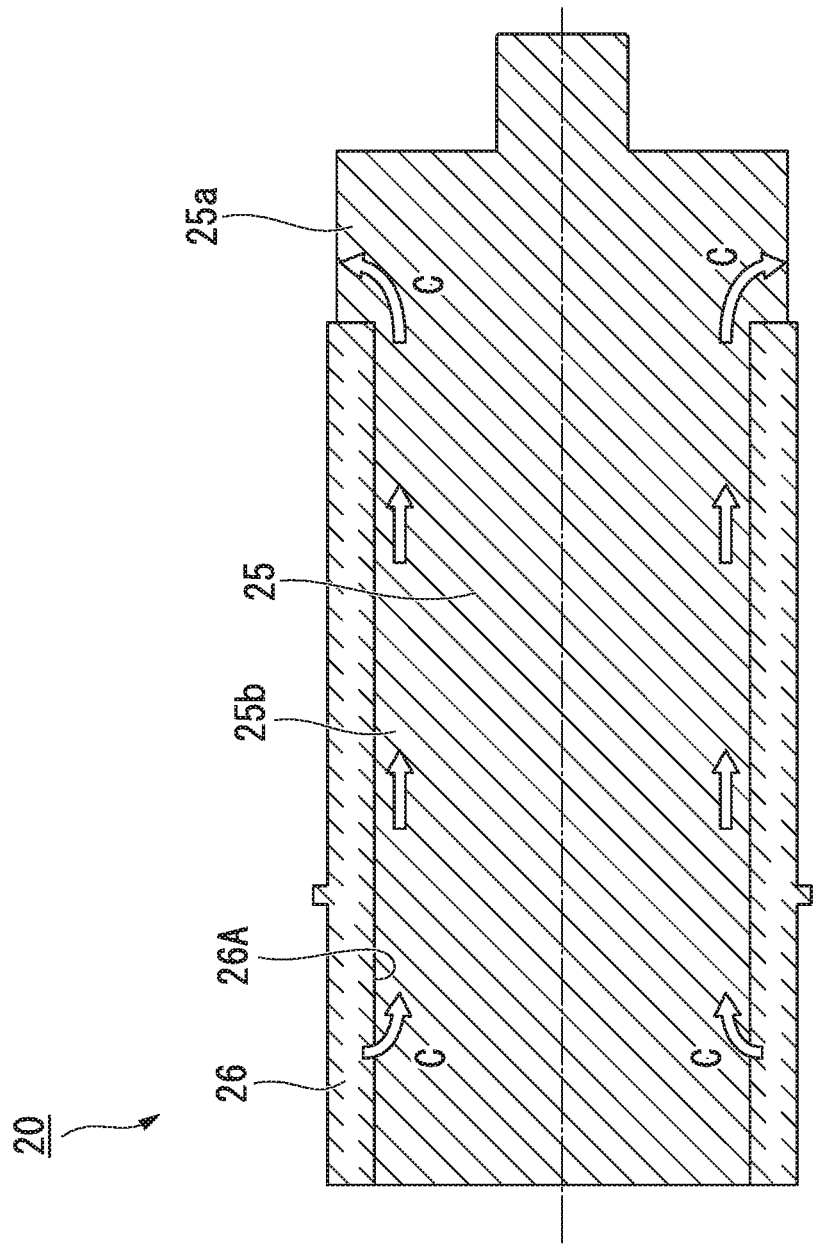
FIG. 4 is a view schematically showing the magnetic fluid sealing structure for high-speed rotation which is an embodiment of the present invention, and is a schematic sectional view showing another example of the layer structure of the shaft member.
Figure 5:
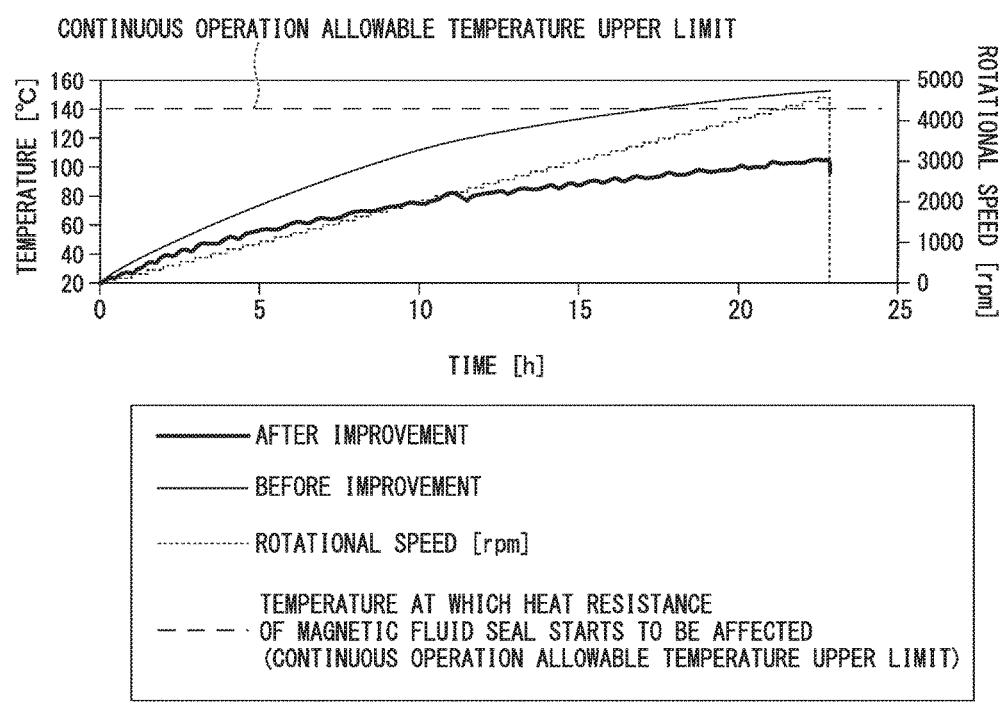
FIG. 5 is a graph showing the temperature rise characteristics of the magnetic fluid sealing structure for high-speed rotation which is an embodiment of the present invention during high-speed rotation in comparison with the characteristics of a structure in the related art.

Hereinafter, the configuration and actions of an example of a magnetic fluid sealing structure for high-speed rotation (hereinafter, may be simply referred to as magnetic fluid sealing structure) which is an embodiment of the present invention, will be described in detail with reference to FIGS. 1 to 5. FIG. 1 is an overall schematic view showing the magnetic fluid sealing structure of the embodiment, and FIG. 2 is a sectional view showing an example of the layer structure of a shaft member. In addition, FIG. 3 is a schematic sectional view showing a conduction path of frictional heat input to the shaft member, and FIG. 4 is a schematic sectional view showing another example of the layer structure of the shaft member. Furthermore, FIG. 5 is a graph showing the temperature rise characteristics of the magnetic fluid sealing structure for high-speed rotation of the embodiment during high-speed rotation in comparison with the characteristics of a structure in the related art.

[Magnetic Fluid Sealing Structure for High-Speed Rotation]

As shown in FIG. 1, a magnetic fluid sealing structure 1 of the embodiment is a structure that seals a gap between a shaft member 2 and a housing member 3 disposed around the shaft member 2, which are rotatably assembled together. The magnetic fluid sealing structure 1 is schematically configured to include magnetic force generating means 4 which is fixed to the housing member 3 and generates a magnetic force, magnetic pole members 5 disposed on both sides in an axial direction of the magnetic force generating means 4, and a magnetic fluid 7 which is magnetically held between the magnetic pole members 5 and the shaft member 2 by the magnetic force of the magnetic force generating means 4 and seals the gap S therebetween.

The magnetic fluid sealing structure 1 of the embodiment performs vacuum separation (seal) between the shaft member 2 extending between two regions of an atmosphere side A (device exterior side) and a vacuum side V (device interior side), and the housing member 3.

The housing member 3 is made of, for example, a non-magnetic metal material, and in the example shown in FIG. 1, includes a cylindrical portion 31 which holds and seals the shaft member 2, and a flange portion 32 by which the magnetic fluid sealing structure is held on the vacuum side V of the cylindrical portion 31. In addition, annular bearings 33 are provided between the cylindrical portion 31 of the housing member 3 and the shaft member 2 to rotatably support the shaft member 2 from an outer circumferential surface 23a side. In addition, the bearings 33 in the shown example are provided at two positions separated from each other in the axial direction of the shaft member 2, and a support member 34 is provided therebetween. Furthermore, the bearing 33 positioned on the side opposite to the flange portion 32 in the bearings 33 is positioned by a fixing member 35 which is attached to an end portion of the cylindrical portion 31 on the device exterior side and the non-flange side.

The flange portion 32 is formed in a flange shape extending in a radial direction, a bottom portion 32A acts as an attachment surface to the device side (not shown), and a plurality of bolt holes 32B for the device attachment are formed to penetrate through the flange portion 32 on the outer circumferential side of the flange portion 32. In addition, an annular recess 32a is formed in the bottom portion 32A, and an annular packing member 6 for achieving sealing with the device side is accommodated in the recess 32a. A stepped portion 32C is provided on part of the flange portion 32 which is on the inner circumferential side of the cylindrical portion 31. By the stepped portion 32C, the magnetic force generating means 4 and the magnetic pole members 5, which are the main portions of the magnetic fluid sealing structure 1 of the embodiment, are supported. That is, the magnetic force generating means 4 and the magnetic pole members 5 are accommodated in an annular space formed by the cylindrical portion 31 and the flange portion 32 while being supported by the stepped portion 32C.

As described above, the magnetic force generating means 4 is fixed to the housing member 3 to generate a magnetic force, is formed in an annular shape in a plan view although a detailed illustration is omitted, and is configured to have different poles (N and S poles) arranged in the axial direction.

The magnetic pole members 5 are arranged as a pair on both sides in the axial direction of the magnetic force generating means 4, are annular members made of a magnetic material, and support the magnetic force generating means 4.

The magnetic fluid 7 is formed by dispersing, for example, ultrafine magnetic particles having a small particle size in a solvent or oil using a surfactant. The magnetic fluid 7 is a fluid having a characteristic that is moved by magnetic field lines and is trapped by a magnetic field in the above-described configuration. As shown in FIG. 1, when the shaft member 2 rotates, the magnetic fluid 7 is magnetically held between the magnetic pole members 5 and a sealing portion 24 of an outermost diameter layer 23 of the shaft member 2, which will be described later, thereby sealing the gap S therebetween.

Here, in the magnetic fluid sealing structure 1, when the shaft member 2 is rotated at a high speed, frictional heat is generated between the magnetic pole members 5 and the shaft member 2 disposed with the magnetic fluid 7 interposed therebetween, and this frictional heat is also input to the shaft member 2. Regarding the frictional heat that is input to the shaft member 2 as described above, the magnetic fluid sealing structure 1 of the embodiment enhances the heat dissipation characteristics of the shaft member 2 and suppresses the temperature rise thereof by optimizing the layer structure, material, and the like of the shaft member 2, and secures sealing characteristics by suppressing a change in the dimensions in the radial direction of the shaft member 2 due to thermal expansion, thereby enabling stable vacuum separation.

Next, the shaft member 2 provided in the magnetic fluid sealing structure 1 of the embodiment will be described in detail with reference to FIGS. 1 to 3 as appropriate.

As described above, the shaft member 2 is a shaft-like member (shaft) rotatably assembled to the housing member 3. In addition, on a part of the outer circumferential surface 23a of the outermost diameter layer 23 of the shaft member 2, the above-described sealing portion 24 is annularly formed in an uneven shape having a plurality of fine protrusions.

In addition, as shown in the sectional view of FIG. 2, in the shaft member 2 of the embodiment, a plurality of different material layers are concentrically laminated in the radial direction, and the outermost diameter layer 23 of the shaft member 2, which holds the magnetic fluid 7, is made of a magnetic material. In addition, the shaft member 2 shown in FIG. 2 has a three-layer structure in which an intermediate layer 22 is provided between an innermost diameter layer 21 and the outermost diameter layer 23. In addition, the shaft member 2 is constituted by multiple members such that metal members having different types and different shapes are integrated into one body by fitting the innermost diameter layer 21 as a core material to the outermost diameter layer 23 as a substantially tubular outer material with the intermediate layer 22 interposed therebetween.

The innermost diameter layer 21 is formed as a substantially shaft-like male member, and in the example shown, is constituted by a flange portion 21A of the shaft member 2, a shaft portion 21B extending from the flange portion 21A, and a columnar protrusion 21C formed to protrude from an end portion 21b of the shaft portion 21B on the device exterior side and a heat dissipating portion side.

The flange portion 21A is a portion exposed to the surface from the end portion of the shaft member 2 on the device interior side and a vacuum chamber side after the innermost diameter layer 21 and the outermost diameter layer 23 are integrated with the intermediate layer 22 interposed therebetween, and also functions as a stopper with which the end portion of the outermost diameter layer 23 on the device interior side and the vacuum chamber side abuts when the shaft portion 21B of the innermost diameter layer 21 is inserted into a fitting hole 23A of the outermost diameter layer 23.

The shaft portion 21B is a shaft-like portion formed to extend from the flange portion 21A, and is formed in a substantially round bar shape although detailed illustration is omitted. The shaft portion 21B is a portion integrated with the fitting hole 23A of the outermost diameter layer 23, which will be described later, with the intermediate layer 22 interposed therebetween.

As described above, the protrusion 21C is a columnar portion formed to protrude from the end portion 21b side of the shaft portion 21B on the atmosphere side opposite to the flange portion 21A. The protrusion 21C may have a configuration in which, for example, a gear shape or a spline shape (not shown) capable of transmitting rotation as described later is formed.

The material of the innermost diameter layer 21 is not particularly limited, and a metal material having excellent strength characteristics and corrosion resistance may be selected in consideration of the application of the magnetic fluid sealing structure 1. However, it is preferable to employ a high-strength material having higher strength than the intermediate layer 22 described later, for example, austenitic or martensitic stainless steel, a titanium alloy material, or the like. In addition, in a case where stainless steel is used for the innermost diameter layer 21, for example, a high-strength stainless steel material such as SUS403 may be used. In this case, the effect of improving the strength characteristics and corrosion resistance of not only the innermost diameter layer 21 but also the entire shaft member 2 can be obtained. In addition, in a case where a metal material having excellent thermal conductivity is selected for the innermost diameter layer 21, it is also possible to use, for example, an aluminum or copper material.

As shown in FIG. 2, the intermediate layer 22 is a different metal layer disposed between the innermost diameter layer 21 and the outermost diameter layer 23, and although detailed illustration is omitted, is a substantially cylindrical layer interposed between the innermost diameter layer 21 and the outermost diameter layer 23, which have\substantially circular sections. In the intermediate layer 22 in the example shown, the outer circumferential surface of the end portion of the intermediate layer 22 on the atmosphere side, which is disposed on the side opposite to the flange portion 21A of the innermost diameter layer 21, is exposed over a predetermined length in the axial direction of the shaft member 2, and the exposed portion acts as a heat dissipating portion 22C.

In the example shown, the heat dissipating portion 22C from which the intermediate layer 22 is exposed is formed as a heat dissipating fin having an uneven shape, and has a function of, in a case where frictional heat or the like is input to the shaft member 2, dissipating this heat to the atmosphere. It is preferable that the maximum diameter of the heat dissipating portion 22C is at the same degree as the maximum diameter of the shaft member 2, that is, the maximum diameter of the outermost diameter layer 23 which will be described later in detail, as in the example shown due to the structure of the magnetic fluid sealing structure 1. On the other hand, it is preferable to secure the length dimension in the axial direction of the heat dissipating portion 22C as long as possible from the viewpoint of further enhancing the heat dissipating effect.

The material of the intermediate layer 22 is not particularly limited, but is preferably a good thermal conductive material having a higher thermal conductivity than that of the outermost diameter layer 23 described later, for example, a good thermal conductive material having a thermal conductivity of 100 W/m·K or higher at room temperature, such as aluminum, copper, or chromium copper. By using such a good thermal conductive material for the intermediate layer 22, even in a case where frictional heat generated on the surface of the shaft member 2 is input to the inside, this heat is dissipated from the heat dissipating portion 22C to the atmosphere, thereby effectively suppressing the temperature rise of the shaft member 2.

The outermost diameter layer 23 is configured as a substantially tubular female member, and as described above, the innermost diameter layer 21 is integrated into the fitting hole 23A with the intermediate layer 22 interposed therebetween. In addition, when the outermost diameter layer 23, the innermost diameter layer 21 and the intermediate layer 22 are assembled together, the flange portion 21A of the innermost diameter layer 21 abuts an end portion 23b of the outermost diameter layer 23 on the device interior side and the vacuum chamber side. An annular protrusion 23c by which the bearings 33 are positioned is formed near substantially the center in the axial direction of the outer circumferential surface 23a of the outermost diameter layer 23 in the example shown.

The material of the outermost diameter layer 23 is not particularly limited as long as it is a magnetic material, and a material in consideration of the strength characteristics and the like as an exterior material may be selected in consideration of the application of the magnetic fluid sealing structure 1. As the magnetic material used for the outermost diameter layer 23, a magnetic material such as austenitic-ferritic, martensitic, or precipitation hardening stainless steel, or an iron-based material may be used. For example, SUS630 or the like may be used.

According to the magnetic fluid sealing structure 1 of the embodiment, the shaft member 2 has a configuration in which a plurality of the different material layers are concentrically laminated in the radial direction and the outermost diameter layer 23 that holds the magnetic fluid is made of a magnetic material. Specifically, the innermost diameter layer 21, the intermediate layer 22, and the outermost diameter layer 23 are assembled together from the inner layer side. In addition, for the innermost diameter layer 21, a material which is a good thermal conductive material having a higher thermal conductivity than that of the outermost diameter layer 23 and has a higher strength than that of the intermediate layer 22 is used. Furthermore, for the intermediate layer 22, a good thermal conductive material having a higher thermal conductivity than that of the outermost diameter layer 23 is used. With the above-described configuration, in the magnetic fluid sealing structure 1, even in a case where frictional heat is generated in the vicinity of the outermost diameter layer 23 and this frictional heat is input to the inner layer side of the shaft member 2, this heat is transferred to the intermediate layer 22 having good thermal conductivity and is efficiently dissipated from the heat dissipating portion 22C exposed to the outside to the atmosphere.

More specifically, first, in the magnetic fluid sealing structure 1 shown in FIG. 1, frictional heat caused by high-speed rotation of the shaft member 2 is generated between the magnetic pole members 5 and the sealing portion 24 of the shaft member 2, which are disposed with the magnetic fluid 7 interposed therebetween. As shown in the schematic sectional view of FIG. 3, this frictional heat is input from the sealing portion 24 (the outer circumferential surface 23a) of the outermost diameter layer 23 of the shaft member 2, is transferred to the inner layer side, and reaches the intermediate layer 22. The frictional heat input to the intermediate layer 22 is transferred through the intermediate layer 22 made of a good thermal conductive material and is guided to the heat dissipating portion 22C (see an arrow C in the figure). As this heat is dissipated from the heat dissipating portion 22C to the atmosphere, the temperature rise of the shaft member 2 can be suppressed, and consequently the thermal expansion of the entire shaft member 2 can be suppressed. As described above, by suppressing the thermal expansion of the shaft member 2, particularly a change in the dimensions in the radial direction, a change in the dimensions of the gap S between the magnetic pole members 5 and the sealing portion 24 of the outermost diameter layer 23 of the shaft member 2, which are disposed with the magnetic fluid interposed therebetween, is also suppressed, so that excellent sealing characteristics can be maintained during high-speed rotation. Therefore, even in a case where the magnetic fluid sealing structure 1 is applied to, for example, a flywheel device which rotates a rotating shaft at a circumferential speed as high as several tens of meters per second, the temperature rise of the rotating shaft and the resultant thermal expansion can be suppressed, and it becomes possible to achieve vacuum separation with stable sealing characteristics.

The results of experiments conducted on the temperature rise characteristics of the magnetic fluid sealing structure 1 for high-speed rotation of the embodiment during high-speed rotation by the inventors while changing rotational speeds, the characteristics of the structure in the related art, and a temperature upper limit at which a magnetic fluid seal can be continuously operated are shown together in the graph of FIG. 5.

As shown in FIG. 5, it can be seen that in the case of the structure in the related art (before improvement), the temperature of a sealing portion sharply rises as the rotational speed increases and reaches about 150° C. at 4600 (rpm), whereas in the structure of the embodiment (after improvement), the temperature of the sealing portion at 4600 (rpm) is about 100° C. and is thus the temperature rise is suppressed. It is thought that this is because, by causing the shaft member to have the above-described structure, frictional heat generated in the vicinity of the outermost diameter layer is transferred through the intermediate layer having good thermal conductivity and is efficiently dissipated from the heat dissipating portion exposed to the outside.

The size and shape of the shaft member 2 having the above-described configuration are not particularly limited, and may be appropriately determined in consideration of the application of the magnetic fluid sealing structure 1. For example, in a case where it is presumed that the magnetic fluid sealing structure 1 shown in FIG. 1 is applied to a high-speed rotating shaft such as a flywheel device or the like, the total outer diameter of the shaft member 2 may be set to approximately 40 mm or more.

In addition, an intervening layer (not shown) may be disposed between the innermost diameter layer 21 and the outermost diameter layer 23 of the shaft member 2, or between the layers of the innermost diameter layer 21, the intermediate layer 22, and the outermost diameter layer 23, that is, on the bonding surface each layer.

In addition, in the magnetic fluid sealing structure 1 of the embodiment, the combination of the metal materials used for the innermost diameter layer, the intermediate layer, and the outermost diameter layer is not particularly limited. For example, in the schematic sectional view shown in FIG. 3, SUS403 or a titanium alloy which is a high strength material for the innermost diameter layer 21, a material such as aluminum, an aluminum alloy, copper (electrolytic copper), or a copper alloy such as chromium copper for the intermediate layer 22, and SUS630 which is a magnetic material for the outermost diameter layer 23 may be appropriately combined and used. Here, while the thermal conductivity of aluminum is about 200 W/m·K, copper has a high thermal conductivity of 380 to 400 W/m·K, also has excellent mechanical strength characteristics, and is thus preferable as the material used for the intermediate layer 22 or the innermost diameter layer 21.

In addition, in the examples shown in FIGS. 1 and 2, the heat dissipating portion 22C of the shaft member 2 is formed as the heat dissipating fin having an uneven shape, but is not limited thereto. For example, the heat dissipating portion may be formed in a pear-skin pattern by a blasting treatment, and even in this case, the same heat dissipation effect as described above can be obtained.

In addition, in the embodiment, although not shown, a liquid circulation circuit for circulating a cooling liquid may be provided in the innermost diameter layer 21 of the shaft member 2. As the liquid circulation circuit is provided in the innermost diameter layer 21, it is possible to efficiently cool the shaft member 2 together with the heat dissipating effect by the heat dissipating portion 22C and the like.

Furthermore, in the embodiment, on at least a part of the surface of the shaft member 2, specifically, a part of the outer circumferential surface 23*a* of the outermost diameter layer 23 or the protrusion 21C of the innermost diameter layer 21, a gear shape or spline shape (not shown) capable of transmitting rotation may be formed. As described above, as the gear shape or spline shape capable of transmitting rotation is provided in the shaft member 2, it becomes possible to easily apply the magnetic fluid sealing structure 1 of the embodiment to various applications such as a flywheel device.

A method of manufacturing the shaft member 2 described above is not particularly limited, and the innermost diameter layer 21, the intermediate layer 22, and the outermost diameter layer 23 may be sequentially fitted together and manufactured using a fitting method well known in the related art.

Here, the shaft member 2 shown in FIG. 2 is configured to have the three-layer structure of the innermost diameter layer 21, the intermediate layer 22, and the outermost diameter layer 23 from the inner layer side, but is not limited to the three-layer structure in the embodiment. For example, like a shaft member 20 shown in the sectional view of FIG. 4, a two-layer structure including two types of different material layers may be provided, and an innermost diameter layer 25 may be made of a good thermal conductive material having a higher thermal conductivity than that of the outermost diameter layer 26. That is, the shaft member 20 shown in FIG. 4 is significantly different from the shaft member 2 shown in FIG. 2 in that no intermediate layer is provided.

In the shaft member 20 shown in FIG. 4, the innermost diameter layer 25 is formed as a substantially shaft-like male member, and in the example shown, includes a flange-like heat dissipating portion 25*a* and a shaft portion 25*b*.

Although a detailed illustration is omitted, the heat dissipating portion 25*a* is formed in a flange shape, and is a portion of which the outer circumferential surface is exposed over a predetermined length in an axial direction of the shaft member 20 after the innermost diameter layer 25 and an outermost diameter layer 26 are fitted together. In addition, the heat dissipating portion 25*a* also functions as a stopper with which the end portion of the outermost diameter layer 26 on the atmosphere side abuts when the shaft portion 25*b* of the innermost diameter layer 25 is inserted into a fitting hole 26A of the outermost diameter layer 26. In addition, although detailed illustration is omitted in the schematic view of FIG. 4, like the shaft member 2 shown in FIGS. 1 and 2, the heat dissipating portion 25*a* may have a plurality of recesses formed in fin shapes. In the case where the heat dissipating portion 25*a* is formed in the fin shapes, when frictional heat is generated due to high-speed rotation of the shaft member 20, high heat dissipation efficiency can be exhibited and it becomes possible to suppress the temperature rise.

Therefore, in FIGS. 2 and 4, in the embodiment, at least a part of the innermost diameter layer 21 or 25 or the intermediate layer 22 acts as the heat dissipating portion 22*c* or 25*a* exposed to the outside over a predetermined length in the axial direction of the shaft member 2 or 20.

The shaft portion 25*b* is a shaft-like portion formed to extend from the flange-like heat dissipating portion 25*a*, and is formed in a substantially round bar shape although detailed illustration is omitted. The shaft portion 25b is a portion fitted into the fitting hole 26A of the outermost diameter layer 26.

As the material of the innermost diameter layer 25, the same material as that of the innermost diameter layer 21 of the shaft member 2 may be used, and for example, a good thermal conductive material such as an aluminum material, a copper alloy (chromium copper), or the like may be used.

In addition, as the material of the outermost diameter layer 26, the same material as that of the outermost diameter layer 23 provided in the shaft member 2 may also be used, and for example, a magnetic material such as a stainless steel material (SUS630) may be used.

In the embodiment, even in a case of employing the shaft member 20 having the two-layer structure as shown in FIG. 4 instead of the shaft member 2 shown in FIGS. 1 and 2, the heat dissipation characteristics of the shaft member can be sufficiently improved, and thus the temperature rise of the shaft member 20 and the resultant thermal expansion can be suppressed. Accordingly, a change in the dimensions of the gap between the outermost diameter layer 26 and the magnetic pole members is suppressed, and excellent sealing characteristics can be maintained, so that stable vacuum separation can be achieved by the magnetic fluid sealing structure 1.

In addition, in the magnetic fluid sealing structure 1 of the embodiment, in addition to the optimization by the combination of the layer structure and the materials of the shaft member described above, the housing member 3 may also be provided with a cooling structure. Specifically, although not shown in the figure, the housing member 3 may be provided with a liquid injection port for cooling, an annular groove may be provided on the outer diameter side of the magnetic pole member 5, and a cooling liquid supplied from the liquid injection port may be circulated through the annular groove of the magnetic pole member 5.

As described above, with the configuration in which the cooling liquid can be supplied from the liquid injection port of the housing member 3 toward the annular groove of the magnetic pole member 5, the magnetic force generating means 4 and the magnetic pole members 5 can be efficiently cooled, and the temperature rise of each member due to frictional heat generated during high-speed rotation of the shaft member 2 can be effectively suppressed.

[Operational Effects]

According to the magnetic fluid sealing structure 1 for high-speed rotation of the embodiment, since the different material layers having excellent thermal conductivities are disposed on the inner layer side while the shaft member 2 satisfies the function as the rotation shaft, frictional heat input to the shaft member 2 is easily dissipated to the outside, and the heat dissipation characteristics of the shaft member 2 are improved. Accordingly, for example, even in a case where the rotating shaft is rotated at a circumferential speed as high as several tens of meters per second, the temperature rise of the shaft member 2 and the resultant thermal expansion can be suppressed, and it becomes possible to achieve stable vacuum separation.

In addition, the configurations, combinations thereof, and the like in the embodiment described above are merely examples, and additions, omissions, substitutions, and other modifications of the configurations are possible without departing from the scope of the present invention. Furthermore, the present invention is not limited by the above-described embodiment, but is limited only by the scope as claimed.

Industrial Applicability

By applying the magnetic fluid sealing structure for high-speed rotation of the present invention to the sealing structure of a rotating shaft used in, for example, a flywheel energy storage system or the like, thermal expansion caused by the temperature rise of the rotating shaft is suppressed, and it becomes possible to maintain an excellent vacuum separation function.

REFERENCE SIGNS LIST 1 magnetic fluid sealing structure for high-speed rotation (magnetic fluid sealing structure)
2 shaft member
3 housing member
4 magnetic force generating means
5 magnetic pole member
6 packing member
7 magnetic fluid
20 shaft member
21 innermost diameter layer
21A flange portion
21B shaft portion
21b end portion
21C protrusion
22 intermediate layer
22C heat dissipating portion
23 outermost diameter layer
23A fitting hole
23a outer circumferential surface
23b end portion
23c annular protrusion
24 sealing portion
25 innermost diameter layer
25a heat dissipating portion
25b shaft portion
26 outermost diameter layer
26A fitting hole
31 cylindrical portion
32 flange portion
32A bottom portion
32B bolt hole
32C stepped portion
32a recess
33 bearing
34 support member
35 fixing member
S gap
A atmosphere side (device exterior side)
V vacuum side (device interior side)

The invention claimed is:

1. A magnetic fluid sealing structure for high-speed rotation for sealing a gap between a shaft member and a housing member disposed around the shaft member, which are rotatable, comprising:
    magnetic force generating means which is fixed to the housing member and generates a magnetic force;
    magnetic pole members disposed on both sides in an axial direction of the magnetic force generating means; and
    a magnetic fluid which is magnetically held between the magnetic pole members and the shaft member by the magnetic force of the magnetic force generating means and seals the gap therebetween,
    wherein the shaft member has a plurality of different material layers concentrically laminated in a radial direction, an outermost diameter layer of the shaft member, which holds the magnetic fluid, is made of a magnetic material, the shaft member has a three-layer structure including the outermost diameter layer, an innermost diameter layer made of a good thermal conductive material having a higher thermal conductivity than that of the outermost diameter layer, and an intermediate layer provided between the innermost diameter layer and the outermost diameter layer, the intermediate layer is made of a good thermal conductive material having a higher thermal conductivity than that of the outermost diameter layer, and the innermost diameter layer is made of a high strength material having a higher strength than that of the intermediate layer.

2. The magnetic fluid sealing structure for high-speed rotation according to claim 1, wherein the innermost diameter layer of the shaft member is made of austenitic or martensitic stainless steel, or a titanium alloy material.

3. The magnetic fluid sealing structure for high-speed rotation according to claim 2, wherein the outermost diameter layer of the shaft member is made of a magnetic material such as austenitic-ferritic, martensitic, or precipitation hardening stainless steel, or an iron-based material.

4. The magnetic fluid sealing structure for high-speed rotation according to claim 2, wherein the shaft member has a three-layer structure in which an intermediate layer is further provided between the innermost diameter layer and the outermost diameter layer, the intermediate layer is made of a good thermal conductive material having a higher thermal conductivity than that of the outermost diameter layer, and the innermost diameter layer is made of a high strength material having a higher strength than that of the intermediate layer.

5. The magnetic fluid sealing structure for high-speed rotation according to claim 2, wherein at least a part of the innermost diameter layer or the intermediate layer of the shaft member acts as a heat dissipating portion exposed to outside in an axial direction of the shaft member.

6. The magnetic fluid sealing structure for high-speed rotation according to claim 1, wherein the outermost diameter layer of the shaft member is made of a magnetic material such as austenitic-ferritic, martensitic, or precipitation hardening stainless steel, or an iron-based material.

7. The magnetic fluid sealing structure for high-speed rotation according to claim 6, wherein the shaft member has a three-layer structure in which an intermediate layer is further provided between the innermost diameter layer and the outermost diameter layer, the intermediate layer is made of a good thermal conductive material having a higher thermal conductivity than that of the outermost diameter layer, and the innermost diameter layer is made of a high strength material having a higher strength than that of the intermediate layer.

8. The magnetic fluid sealing structure for high-speed rotation according to claim 6, wherein at least a part of the innermost diameter layer or the intermediate layer of the shaft member acts as a heat dissipating portion exposed to outside in an axial direction of the shaft member.

9. The magnetic fluid sealing structure for high-speed rotation according to claim 1, wherein the intermediate layer of the shaft member primarily contains aluminum or copper having a thermal conductivity of 100 W/m·K or higher at room temperature.

10. The magnetic fluid sealing structure for high-speed rotation according to claim 9, wherein at least a part of the innermost diameter layer or the intermediate layer of the shaft member acts as a heat dissipating portion exposed to outside in an axial direction of the shaft member.

11. The magnetic fluid sealing structure for high-speed rotation according to claim 1, wherein at least a part of the innermost diameter layer or the intermediate layer of the shaft member acts as a heat dissipating portion exposed to outside in an axial direction of the shaft member.

12. The magnetic fluid sealing structure for high-speed rotation according to claim 11, wherein the heat dissipating portion is a heat dissipating fin having an uneven shape.

13. The magnetic fluid sealing structure for high-speed rotation according to claim 11, wherein the heat dissipating portion has a pear-skin pattern formed by a blasting treatment.

14. The magnetic fluid sealing structure for high-speed rotation according to claim 1, wherein the housing member is provided with a liquid injection port for cooling, an annular groove is provided on an outer diameter side of the magnetic pole member, and a cooling liquid supplied from the liquid injection port is circulated through the annular groove.

15. The magnetic fluid sealing structure for high-speed rotation according to claim 1, wherein a liquid circulation circuit for circulating the cooling liquid is provided in the innermost diameter layer of the shaft member.

16. The magnetic fluid sealing structure for high-speed rotation according to claim 1, wherein at least a part of a surface of the shaft member is a gear shape or spline shape capable of transmitting rotation.

17. The magnetic fluid sealing structure for high-speed rotation according to claim 1, wherein the outermost diameter layer of the shaft member is made of a magnetic material such as austenitic-ferritic, martensitic, or precipitation hardening stainless steel, or an iron-based material.

18. The magnetic fluid sealing structure for high-speed rotation according to claim 1, wherein at least a part of the innermost diameter layer or the intermediate layer of the shaft member acts as a heat dissipating portion exposed to outside in an axial direction of the shaft member.

\* \* \* \* \*